United States Patent
Hollander et al.

(10) Patent No.: US 10,860,865 B2
(45) Date of Patent: Dec. 8, 2020

(54) PREDICTIVE SECURITY CAMERA SYSTEM

(71) Applicant: Chiral Software, Inc., Beverly Hills, CA (US)

(72) Inventors: Eric Jonathan Hollander, Beverly Hills, CA (US); Michael Travis Remington, Seattle, WA (US)

(73) Assignee: Chiral Software, Inc., Beverly Hills, CA (US)

( * ) Notice: Subject to any disclaimer, the term of this patent is extended or adjusted under 35 U.S.C. 154(b) by 110 days.

(21) Appl. No.: 16/388,492

(22) Filed: Apr. 18, 2019

(65) Prior Publication Data

US 2020/0089965 A1  Mar. 19, 2020

Related U.S. Application Data

(63) Continuation-in-part of application No. 16/130,532, filed on Sep. 13, 2018, now Pat. No. 10,650,275.

(51) Int. Cl.
*G06K 9/62* (2006.01)
*G06K 9/00* (2006.01)
(Continued)

(52) U.S. Cl.
CPC ..... *G06K 9/00771* (2013.01); *G06K 9/00718* (2013.01); *G06K 9/6232* (2013.01);
(Continued)

(58) Field of Classification Search
CPC . G06T 2207/10016; G06T 2207/30232; G06T 7/292; G06T 7/73; G06K 9/00771;
(Continued)

(56) References Cited

U.S. PATENT DOCUMENTS 8,167,430 B2   5/2012   Cobb et al.
8,180,105 B2   5/2012   Cobb et al.
(Continued)

FOREIGN PATENT DOCUMENTS

EP   2883355 A1   6/2015

OTHER PUBLICATIONS

International Search Report and Written Opinion in co-pending PCT Application PCT/US2019/047631 dated Nov. 18, 2019.

*Primary Examiner* — Guillermo M Rivera-Martinez
(74) *Attorney, Agent, or Firm* — Young Basile Hanlon & MacFarlane, P.C.

(57) ABSTRACT

A predictive security camera system includes a camera, an object recognizer for detecting an object in a current frame of the camera, a convolutional encoder for generating a feature representation of the current frame, a primary clustering module for clustering the feature representation in primary clusters of the detected object, a vector generation module for generating an information vector that includes a set of variables such as primary class, sub-class, and one or more external factors associated with the feature representation, an anomaly clustering module for clustering each information vector into one or more secondary clusters wherein each variable in the information vector is a clustering dimension, and a predictive analysis module for receiving at least one variable of an information vector as an input, and predicting at least one another variable of the information vector based on one or more previous secondary clusters formed by the anomaly clustering module.

20 Claims, 5 Drawing Sheets

(51) Int. Cl.
*G06N 3/08* (2006.01)
*G06N 3/04* (2006.01)

(52) U.S. Cl.
CPC ................ *G06N 3/04* (2013.01); *G06N 3/08* (2013.01); *G06K 2009/00738* (2013.01)

(58) Field of Classification Search
CPC .. G06K 9/00288; G06K 9/00744; G06K 9/46; G06K 9/6218
See application file for complete search history.

(56) References Cited

U.S. PATENT DOCUMENTS

| | | |
|---|---|---|
| 9,111,148 B2 | 8/2015 | Seow et al. |
| 9,589,595 B2 * | 3/2017 | Gao .......................... G06K 9/32 |
| 9,743,078 B2 | 8/2017 | DeForest et al. |
| 2012/0294511 A1 | 11/2012 | Datta et al. |
| 2016/0328654 A1 | 11/2016 | Bauer et al. |
| 2017/0220887 A1 | 8/2017 | Fathi et al. |
| 2019/0205649 A1 * | 7/2019 | Ananthanarayanan ..................... G06K 9/6269 |
| 2019/0325227 A1 * | 10/2019 | Smith .............. H04N 21/23476 |

* cited by examiner

PREDICTIVE SECURITY CAMERA SYSTEM

CROSS-REFERENCE TO RELATED APPLICATIONS

This application is a continuation-in-part of U.S. patent application Ser. No. 16/130,532, filed on Sep. 13, 2018, the contents of which are incorporated by reference herein in their entirety.

FIELD OF THE DISCLOSURE

The present disclosure relates generally to a predictive security camera system, and more particularly to systems and methods for generating future predictions regarding time, location and classes of objects that have been previously captured by the camera.

BACKGROUND

Object recognition is a technology in the field of computer vision for finding and identifying objects in an image or video sequence. Typically, an object recognition model is a machine learning model related to computer vision and image processing that deals with detecting instances of semantic objects of a certain class (such as humans, buildings, or cars) in digital images and videos.

Convolutional Neural Network (CNN) is a type of premier algorithm used in the object recognition. A standard CNN consist of a series of layers that perform mathematical computations on an image. The recognizing and classifying of objects into fine grained categories requires a deep CNN with many layers. Each layer requires millions of floating point operations, and also requires memory access by corresponding Central Processing Unit (CPU).

Anomaly detection is an unsupervised learning task where the goal is to identify abnormal patterns or motions in video data that are by definition, infrequent or rare events. However, a key aspect of an anomaly is not just that it is rare, but that it breaks the pattern. Negative anomalies are situations in which something fails to happen, which would have normally have happened. An existing anomaly detection system detects visual anomalies in video streams by first implementing a series of convolutional layers to produce a feature representation of the visual input, and then clustering each representation in one or more clusters in such a way that objects in the same cluster are more similar to each other than to those in other clusters. If a frame appears outside of a cluster, it is considered an anomaly.

However, existing anomaly detection systems are only good at detecting out of place objects, for example, a car driving on a pedestrian path. They cannot predict a time of appearance of a certain object at a predefined location, or predict an object appearing at a predefined time and location. None of existing object detection systems are able to generate future predictions regarding time, location and classes of objects that have been previously captured by the camera.

In view of the above, there is a need for a predictive security camera system that is able to generate future predictions regarding time, location and class of one or more predefined objects, is less computationally complex and has increased speed and accuracy. The anomaly detection technique should be able to detect negative anomalies, and provide text labels that identify the anomalous objects. Such security camera system should allow for smooth object-recognition output on less powerful hardware such as edge devices and small computers that lack Graphic processing units (GPUs), so as to save computational resources and electricity costs, and therefore achieve longer operating time, especially on battery operated portable devices.

SUMMARY

In accordance with an embodiment of the present disclosure, there is provided a predictive security camera system that includes a camera configured to capture a video stream, an object detection system configured to detect an object in a current frame of the video stream, process the current frame to generate a processed image frame that contains the detected object, and determine a primary class of the detected object. The predictive security camera system further includes a convolutional encoder configured to generate a feature representation of the processed current frame, a primary clustering module configured to cluster the feature representation in one or more primary clusters in a clustering space of the primary class, wherein the one or more primary clusters correspond to a sub-class of the primary class, a vector generation module configured to generate an information vector of the feature representation, wherein the information vector includes a set of variables that include the primary class, corresponding sub-class, and one or more external factors associated with the feature representation, and an anomaly clustering module configured to cluster each information vector of the video stream into one or more secondary clusters wherein each variable in the information vector is a clustering dimension, and report a next frame as an anomaly when a corresponding information vector is positioned outside a secondary cluster of the one or more secondary clusters of an information vector of a previous frame. The predictive security camera system further includes a predictive analysis module configured to receive at least one variable of an information vector as an input, and predict at least one another variable of the information vector based on one or more previous secondary clusters formed by the anomaly clustering module.

In accordance with another embodiment of the present disclosure, there is provided a method for predicting one or more future incidents related to one or more previously detected objects. The method includes capturing a video stream using a camera, detecting an object in a current frame of the video stream and processing the current frame to generate a processed current frame that contains the detected object, determining a primary class of the detected object, generating a feature representation of the processed current frame by a convolutional encoder, clustering the feature representation in one or more primary clusters in a clustering space of the primary class, wherein the one or more primary clusters correspond to a sub-class of the primary class, generating an information vector of the feature representation, wherein the information vector includes a set of variables that include the primary class, corresponding sub-class, and one or more external factors associated with the feature representation, clustering each information vector of the video stream into one or more secondary clusters, wherein each variable in the information vector is a clustering dimension, reporting a next frame as an anomaly when a corresponding information vector is positioned outside a secondary cluster of the one or more secondary clusters, of an information vector of a previous frame, receiving at least one variable of the information vector as an input, and predicting at least one another variable of the information vector based on one or more previously formed secondary clusters.

In accordance with yet another embodiment of the present disclosure, there is provided a computer programmable product for predicting one or more future incidents related to one or more previously detected objects, the computer programmable product comprising a set of instructions. The set of instructions when executed by a processor causes the processor to capture a video stream using a camera, detect an object in a current frame of the video stream and process a current frame to generate a processed current frame that contains the detected object, determine a primary class of the detected object, generate a feature representation of the processed current frame by a convolutional encoder, cluster the feature representation in one or more primary clusters in a clustering space of the primary class, wherein the one or more primary clusters correspond to a sub-class of the primary class, generate an information vector of the feature representation, wherein the information vector includes a set of variables that include the primary class, corresponding sub-class, and one or more external factors associated with the feature representation, cluster each information vector of the video stream into one or more secondary clusters, wherein each variable in the information vector is a clustering dimension, report a next frame as an anomaly when a corresponding information vector is positioned outside a secondary cluster of the one or more secondary clusters, of an information vector of a previous frame, receive at least one variable of the information vector as an input, and predict at least one another variable of the information vector based on one or more previous secondary clusters.

Various embodiments of the present disclosure takes into account of various key aspects of real-world knowledge such as pre-defined categories of important objects (person, car, dog, etc) and external factors such as time of day, day of week, weekday/weekend, business open/closed, holiday/not holiday status, day/night status, weather input (clear, cloudy, rainy, etc), and other data. Advantages of the predictive security camera system include predicting most common classes of objects at certain times and dates, and predicting the times at which specific classes appear at most often using an anomaly detection system.

Various embodiments of the present disclosure may find application in edge devices like drones and security cameras, which cannot stream data to a server for processing, do not have a high bandwidth network connection and do not have expensive and specialized GPU based hardware for complex computations, but the user needs to have a live camera view all the time.

BRIEF DESCRIPTION OF DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
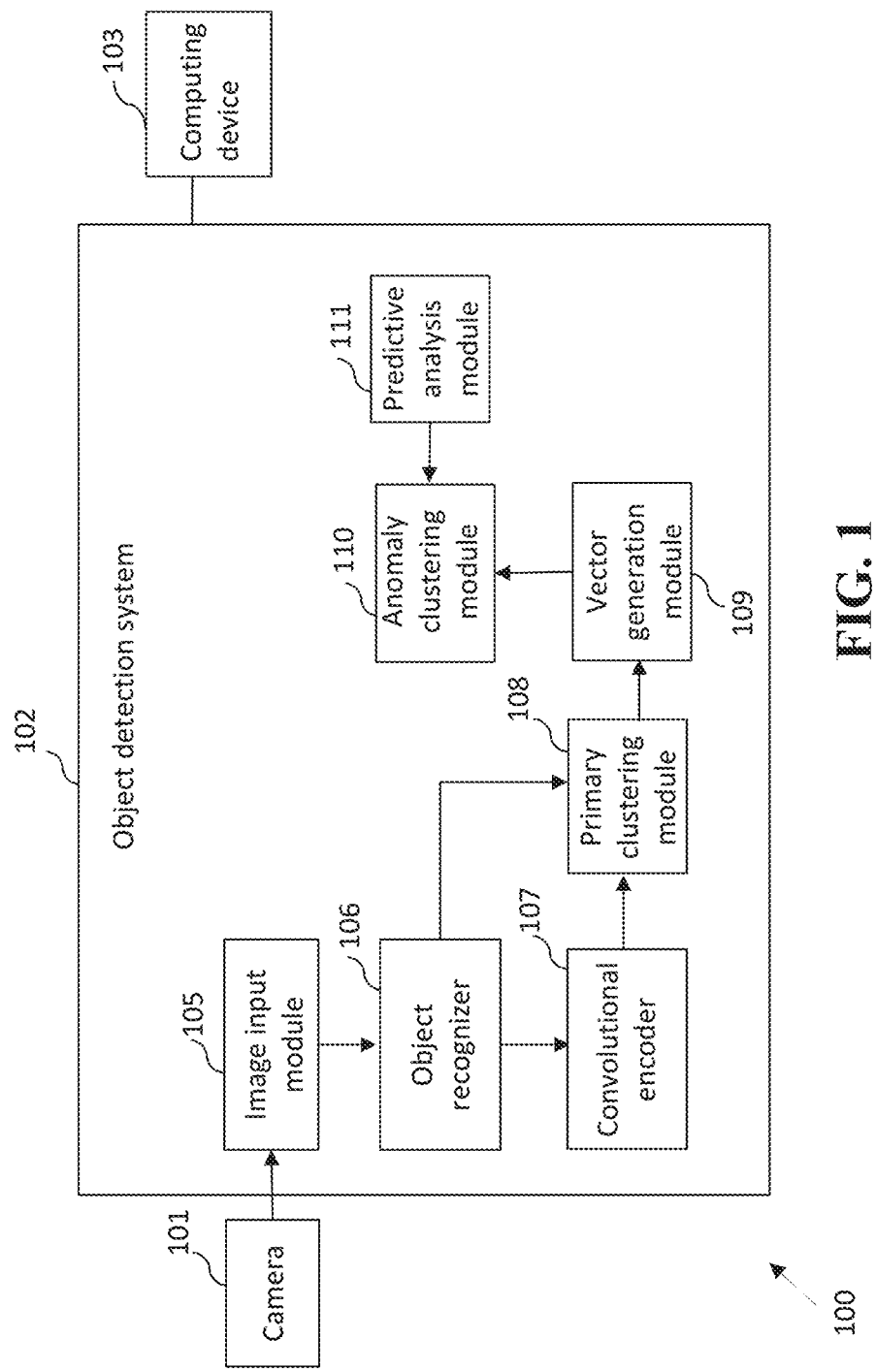
FIG. 1 illustrates a predictive security camera system, in accordance with an embodiment of the present disclosure.

Referring now to FIG. 1, a schematic block diagram of a predictive security camera system 100 is illustrated, wherein various embodiments of the present invention can be practiced. The predictive security camera system 100 includes a camera 101, an object detection system 102, and a computing device 103.

The camera 101 is configured to capture and store the video of one or more objects in real-time. Examples of the camera 101 include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

The object detection system 102 is configured to detect one or more objects in a video stream captured by the camera 101, detect temporal pattern anomalies in the video stream based on the object detection, and predict future appearance of one or more objects at one or more predefined locations, based on the detected temporal pattern anomalies.

The object detection system 102 is connected to the camera 101 either physically through a universal serial bus (USB), or through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The camera 101 and the object detection system 102 may be controlled/operated by an external user computing device 103. The user computing device 103 may be connected to the object detection system 102 either through a wired connection, or through a wireless communication network. Examples of the computing device 103 include a smartphone, a personal computer, a laptop, and the like. The computing device 103 enables the user/operator to view and save the videos captured by the camera 101, and access the videos/images processed by the object detection system 102. The object detection system 102 may include a processor, computer, microcontroller, or other circuitry that may execute software, firmware, and/or other instructions, for example, that are stored on a volatile or non-volatile memory, such as an inbuilt memory, or otherwise provided thereto. In an embodiment of the present disclosure, he the object detection system 102 may include a custom Graphic processing unit (GPU) server software to provide real-time object detection and prediction, for all cameras on a local network. The user computing device 103 may execute a mobile application of the object detection system 102 so as to enable a user to access and process the video stream captured by the camera 101.

In an embodiment of the present disclosure, the camera 101, the object detection system 102, and the user computing device 103, may be integrated in a single device, where the single device is a portable smartphone having a built-in camera and a display.

In another embodiment of the present disclosure, the camera 101 and the object detection system 102, may be external to the user computing device 103, and coupled thereto through the communication network.

In another embodiment of the present disclosure, the object detection system 102 may transmit the object recognition results to other components for further processing, storage, or such as the user interface for display. In an example, the coordinates and label of recognized objects may be sent as a message along with the video frames, to display labels and/or bounding boxes on live video streams on a display of the user computing device 103, or the coordinates and labels may be stored with the frames, or used for transmitting alerts, or other purposes. In one embodiment, the object detection system 102 may generate a video output for display in which bounding boxes are drawn around detected objects, and/or a pixel mask is formed on the exact object detected, or substantially exact object detected.

In yet another embodiment of the present disclosure, the camera 101 may be an Internet Protocol (IP) camera external to the object detection system 102 and the user computing device 103, and coupled thereto through the communication network.

The object detection system 102 includes an image input module 105, an object recognizer 106, a convolutional auto-encoder 107, a primary clustering module 108, a vector generation module 109, an anomaly clustering module 110, and a predictive analysis module 111.

The object recognizer 106 may include a machine learning model related to computer vision and image processing configured to detect instances of semantic objects of a certain class (such as humans, buildings, or cars) in digital images and videos. This type of machine learning algorithm uses an advanced real-time variant of open-source object detection algorithm. An example of the object recognizer 106 is You look only once (YOLO), which is a state-of-the-art, a real-time object detection system. The object recognizer 106 is trained with knowledge about broad classes of various application areas, and has semantic knowledge of the content of a frame. In an example security system, the broad classes may include a person, a car, etc, and for an underwater system, the classes might be diver, underwater vehicle, fish, etc.

The convolutional auto-encoder 107 is a type of neural network that is configured to encode visual information of the cropped image frame into the feature representation. The convolutional auto-encoder 107 includes multiple processing layers, where each top layer processes an output generated by corresponding bottom layer, and the layers may be trained to identify relevant information.

The primary clustering module 108 includes an N-dimensional clustering space for each primary class, which implies that within a clustering space of a broad class, different clusters may be formed indicative of different sub-classes of the primary class. For example, if the object recognizer 106 detects 'car', 'bicycle', and 'truck', then there would be three primary clustering spaces. This means that there would be 3 clustering models, and each model may automatically learn sub-categories within the 3 classes. In an example, a sub-category of the 'car' may be 'car model', a sub-category of 'bicycle' may be 'color of bicycle', and a sub-category of the 'truck' may be 'size of truck'. Further, within each primary clustering space, there will be N dimensions corresponding to the shape of the feature representation that is clustered. In an embodiment of the present disclosure, the primary clustering module 108 is configured to automatically learn of regularly viewed categories, such as learning which persons are frequently seen at a location, and identifying them as Person 1, Person 2, etc. in the clustering space of the broad class, based on corresponding sub-class.

The primary clustering module 108 generates and transmits a cluster identification (ID) of the detected object to the vector generation module 109 along with any relevant information such as time, date, weather, or other contextual data. The vector generation module 109 generates an information vector based on the information provided by the primary clustering module 108. The anomaly clustering module 110 is configured to cluster the information vector based on corresponding class, sub-class, and context information (date, time, etc), and report a current frame as an anomaly if a corresponding information vector is positioned outside a secondary cluster of a previous frame. In an embodiment of the present disclosure, the anomaly clustering module 110 may sent the report regarding the anomalies to the user computing device 103. The predictive analysis module 111 is configured to generate future predictions regarding time, location and classes of objects that have been previously captured by the camera 101.

In an embodiment, each of the seven components 105-111 could exist on a single physical computer, or on more than one computer and communicate through messaging protocols. If the seven components run on a single computer, they could run in separate processes that communicate via communication protocols. If they run within a single process, they might run as threads. A thread is the smallest unit of processing that can be performed in an operating system. In most modern operating systems, a thread exists within a process, that is, a single process may contain multiple threads. If running in a single process, they could also use a reactive design, enabling the components to share one or more threads. The components 105-111 may be implemented in a programming language.

Figure 2:
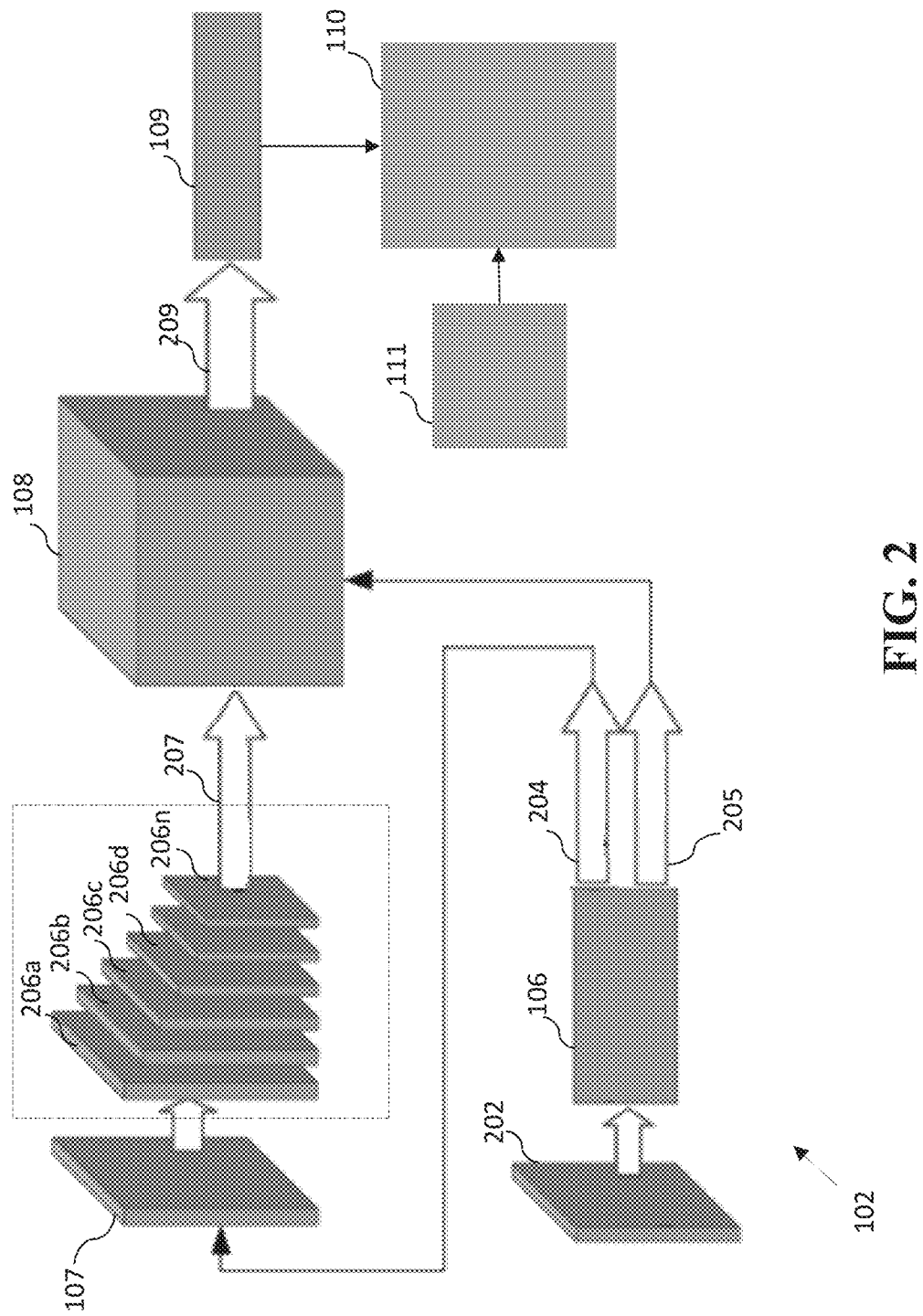
FIG. 2 illustrates a detailed view of an object detection system of the predictive security camera system of FIG. 1, in accordance with an embodiment of the present disclosure.

FIG. 2 illustrates a detailed view of the object detection system 102, in accordance with an embodiment of the present disclosure.

The object detection system 102 includes the object recognizer 106 that is configured to receive a stream of image frames from the camera 101. The object recognizer 106 receives an input image frame 202, and processes the input image frame 202 to create a list of detected objects. This list includes confidence values and locations, which could be bounding box coordinates or more precise location information of each detected object. The object recognizer 106 generates a label (class) 205 that may be displayed next to each object's location. The returned coordinates may be used to draw bounding boxes around each detected object. In an embodiment of the present disclosure, the object detection module 106 crops the input image frame 202 based on the detected object, so as to generate a cropped image frame 205 that contain the detected objects. The object recognizer 106 thus, generates two outputs for each image frame: the cropped or masked image 204 of a detected object, and a generic label/class 205 of the detected object. The masked image 204 is generated by masking the input image frame 202 with a predefined mask image.

In an example, the object detection module 106 first crops/masks an input image frame 202 based on the detected object, and then classifies the detected object based on foreground/background detection, into one or more generic classes such as "vehicle", "person", an "unknown", or an "other". The cropped image frame 204, and corresponding broad class 205 may be transmitted by the object detection module 106 as two separate messages.

The cropped image frame 204 is received by the convolutional auto-encoder 107 that includes first through nth convolutional layers 206a till 206n (hereinafter collectively referred to as convolutional layers 206) to produce a feature representation 207 of the cropped image frame 204. The bottom most layer is an input layer 206a that receives the cropped frame 204. The layer above the input layer 206a is a first processing layer 206b that may process the cropped frame. The top-most layer 206n generates a feature representation 207 of the cropped image frame. Although, six processing layers have been illustrated herein for the sake of brevity, it would be obvious to one of ordinary skill in the art, that the number of processing layers may be greater than or less than six.

Figure 3:
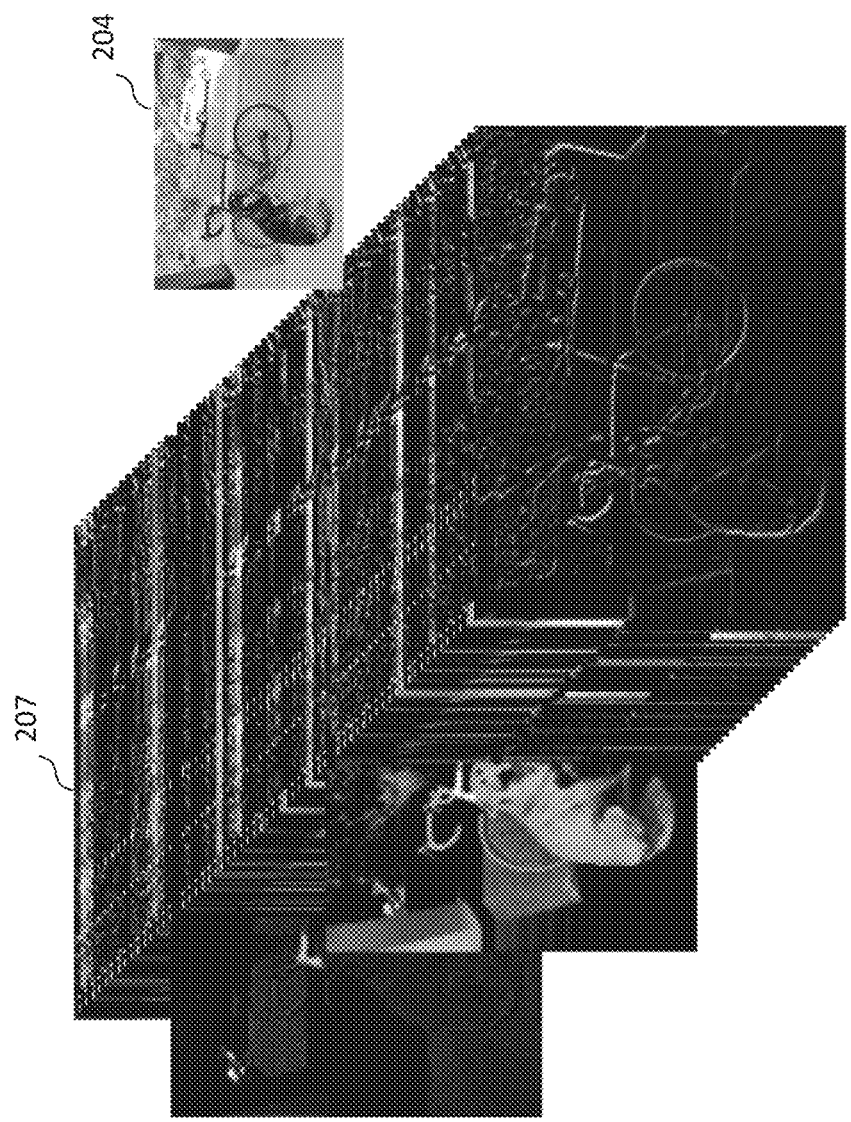
FIG. 3 illustrates an exemplary feature representation of an image.

Each convolutional layer 206 includes a filter that scans for learned features such as all the edges in the image frame 204. In an example, each convolutional layer includes a filter of weights that slides over the image, and performs multiplication over each image patch. The feature representation 207 is a tensor that contains learned relevant information about the input image frame 202, and combines the output of all these filters. It is a tensor of numbers that represents whatever the convolutional neural network 'learned' was most important in the image. Thus, the convolutional auto-encoder 107 encodes the cropped image 204 into the feature representation 207, representing relevant visual features that distinguish the object. An exemplary feature representation 207 of the cropped image frame 204 has been illustrated with reference to FIG. 3.

Referring back to FIG. 2, the primary clustering module 108 receives the feature representation 207 of the detected object from the convolutional auto-encoder 107, and the corresponding primary class 205 from the object recognizer 106. The primary clustering module 108 clusters the feature representation 207 of the detected object in the clustering space of corresponding primary class 205, based on corresponding sub-class. In an example, the clustering space for "car" might cluster the detected cars into separate groups according to make, model, etc. Further, clustering may become specific to individual cars, so the cluster would learn about Car 1, Car 2, etc. These may correspond to specific cars which the system is used to seeing.

It may be noted that the function of the convolutional auto-encoder 107 is different from the object recognizer 106, though they both use convolutional layers. The object recognizer 107 finds objects within a frame, whereas the convolutional auto-encoder 107 takes these found objects and transforms them into a format that the primary clustering module 108 can work with more efficiently. Instead of arbitrary features, the convolutional auto-encoder 107 automatically learns what visual features are most critical to the clustering engine. These features are represented in a tensor of values fine-tuned by the convolutional auto-encoder 107. This is the advantage of the deep-learning based approach.

Figure 4:
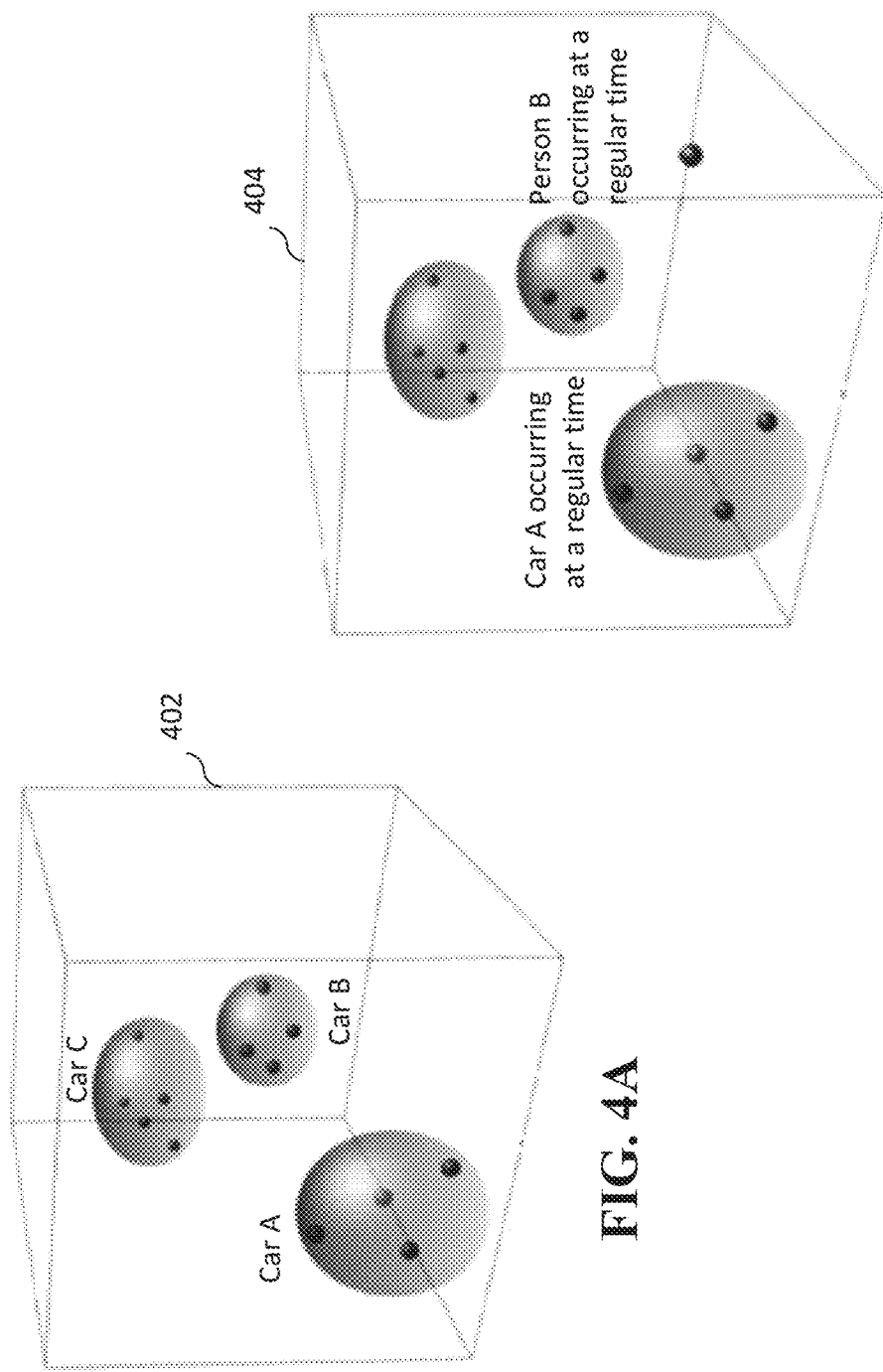
FIG. 4A illustrates primary clustering of an object in one or more predefined sub-classes, in accordance with an embodiment of the present disclosure.
FIG. 4B illustrates secondary clustering of an object according to the contextual information of the object.

FIG. 4A illustrates an example of primary clustering for class 'car' in a primary clustering space 402. The many dimensions of the feature representation of the 'car' are represented herein, in three dimensions/three sub-classes of the 'car'. Each cluster is a sub-category of similar occurrences. In this case, each cluster could be a specific car, or a brand of car, and each black dot is an occurrence of the class.

Referring back to FIG. 2, the primary clustering module 108 generates a cluster identification (ID) 209 of the cropped image frame 204 based on the clustering of the corresponding feature representation 207 in clustering space of corresponding primary class 205. The cluster ID 209 may include a sub-class of the cropped image frame 204. Thereafter, the primary clustering module 108 transmits the cluster ID 209 of the detected object to a vector generation module 109 along with any relevant information such as time, date, weather, or other contextual data.

The vector generation module 109 generates an information vector based on the information provided by the primary clustering module 108. The information vector is a set that contains a broad category/class of the detected object, the sub-category (cluster ID) and any other relevant information such as time, date, weather and other contextual data associated with corresponding inputs image frame 202. Here is an example of the information vector and corresponding key:

Vector: [class number, cluster_id, minute of day, day, weekday, month]

Corresponding key: [24, 2, 812, 17, 5, 11]

The corresponding key may represent that an object of Class '24', cluster_id '2' was detected at 1:31 pm on Thursday, November 17$^{th}$.

Although, the information vector is shown to have six elements, it would be apparent to one of ordinary skill in the art, that the information vector may include less than or more than six elements.

The anomaly clustering module 110 is configured to receive the information vector from vector generation module 109 and cluster the information vector into one or more secondary clusters. In anomaly clustering, each variable in the information vector is a clustering dimension, and data points that are similar across the variables of the information vector may be clustered together. In an example, if two different cars are spotted at the same time, five of the six variables would be the same, except for the cluster_ID, so they would be clustered together in the time, date, and class dimensions of the clustering space. Thus, the anomaly clustering module 110 is configured to cluster the information vector based on corresponding class, sub-class, and context information (date, time, etc), and report a current frame as an anomaly if a corresponding information vector is positioned outside a secondary cluster of a previous frame. Thus, the anomaly detection is an unsupervised learning task where the goal is to identify abnormal patterns or motions in data that are by definition infrequent or rare events. In an embodiment of the present disclosure, the anomaly clustering module 110 uses a clustering algorithm such as Gaussian Mixture Model (GMM) to perform secondary clustering.

FIG. 4B illustrates an example of an anomaly clustering for multiple classes in a secondary clustering space 404.

In an example scenario, the camera could be placed in the driveway of a home. The many dimensions of the feature representation of the information vector may be represented here in three dimensions. Each dot is an occurrence of a sub-category. The position of a dot is dependent on the variables in the information vector such as date, time, class, and sub-category (cluster ID). Each cluster is a group of similar occurrences. The lone data point is an anomaly, because it does not belong to any established group. The two labeled clusters show the learned patterns of car A and person B. Car A could be the homeowner's car, and person B could be the person who regularly drives the car, the homeowner. The unlabeled cluster could be person A, the homeowner's wife occurring at regular times. The lone anomalous data point could be a wild animal crossing the driveway, or an unwelcome person such as a burglar.

The anomaly clustering is useful when a particular vehicle (sub-category of vehicles) has to be monitored. That is, the specific details of a particular event, i.e., "what and where" something occurred within a scene, such as a particular vehicle (car A) moved to a location that is believed to be a parking space (parking space 5) at 9:43 AM. The same clustering-within-primary classes process learns to identify a set of familiar objects-within-primary classes. This could be used to automatically construct "stories". For example, a story might be, "This morning, we saw persons 2, 6, and 9, and car 3, and two unknown cars." In another example, it is rare to see a vehicle on the pedestrian walkaway, so it may appear outside any regular cluster. This means, it is an anomaly.

The predictive analysis module 111 is configured to predict appearance of one or more objects at a predefined time and at a predefined location based on the information processed by the anomaly clustering module 110. As illustrated, the clustering module 110 receives the information vector from the vector generation module 109, wherein the information vector includes information about class and sub-class of object along with contextual information such as weather, time, and date regarding the object. A typical information vector looks like:

[class_number, cluster_id, time, date, weather, . . . ].

In an embodiment of the present disclosure, the predictive analysis module 111 is configured to use the learned probabilities in the GMM of the anomaly clustering module 110, to generate predictions. By inputting the time, date, weather and a location, the predictive analysis module 111 may output the expected objects at that time. Thus, the predictive analysis module 111 uses the learned distributions of the clustering algorithm (GMM) to predict what objects will appear at a given time and date.

The predictive analysis module 111 may generate output as class labels or times and dates. In an embodiment of the present disclosure, the predictive analysis module 111 may generate the time/date with the highest probability of a specific object occurring. In an example, when the input to the predictive analysis module 111 is "person 4", and the output of the predictive analysis module 111 would be "Mondays at 10:30" as this is the most common time 'person 4' is seen.

Applications of the Present Disclosure

1. The video surveillance and other security applications may install the system of the present disclosure to allow users to prepare for incidents ahead of time, such as if there is a pattern of when incidents occur.
2. Hunters could use the system of the present disclosure to know when to be present at a location to get their targets.
3. Military and law enforcement users could use the system of the present disclosure to address threats in a proactive way, or create an ambush for threats, if those threats have detectable patterns.

Figure 5:
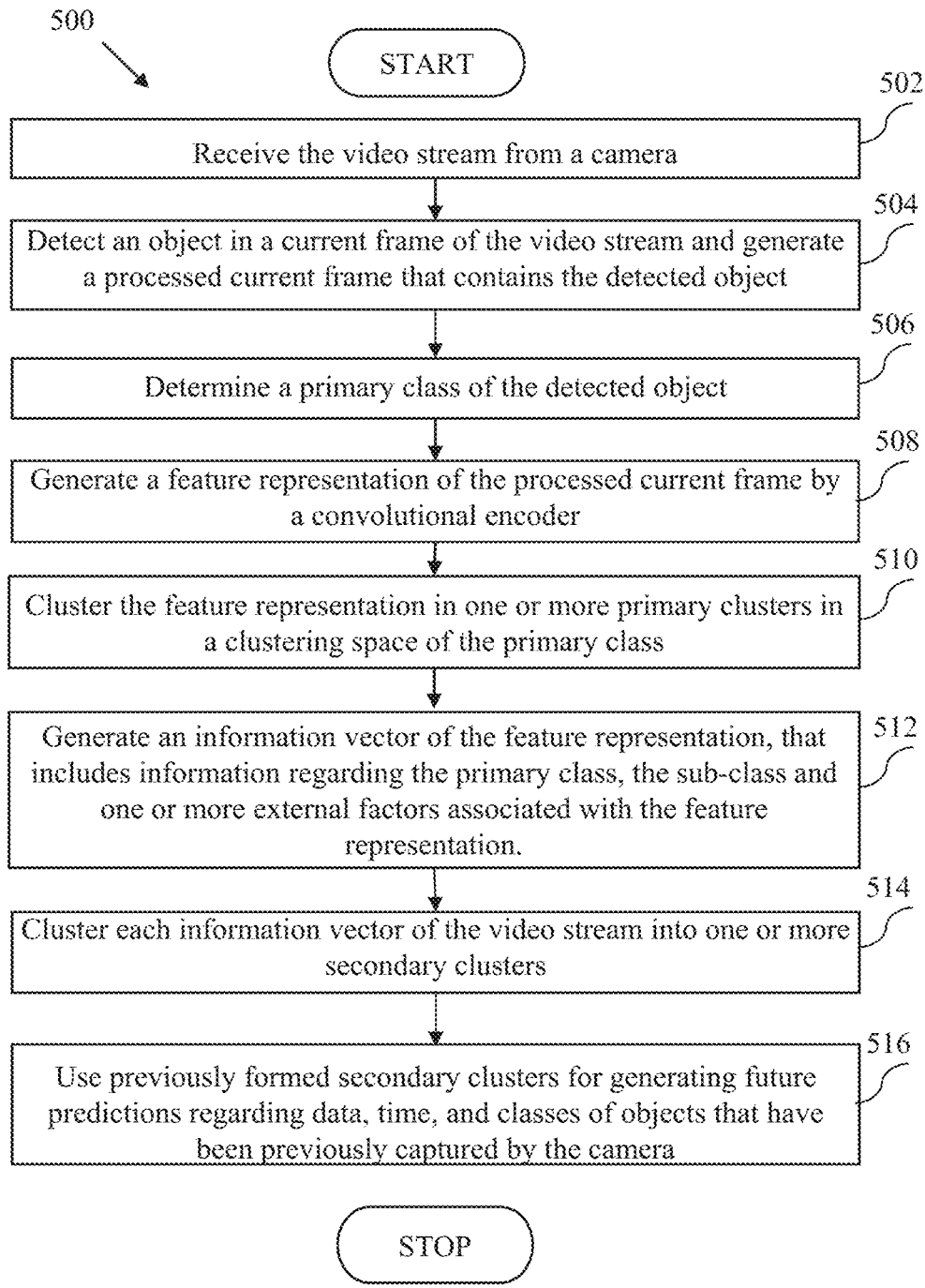
FIG. 5 is a flow chart to illustrate a method for generating future predictions regarding time, date and class of an object, in accordance with an embodiment of the present disclosure.

FIG. 5 is a method flowchart 500 for predicting appearances of objects in a given context, in accordance with an embodiment of the present disclosure. Some steps may be discussed with respect to the system as shown in FIGS. 1 and 2.

At step 502, the video stream is received from a camera. Examples of the camera include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

At step 504, an object is detected in a current frame of the video stream and a processed current frame is generated that contains the detected object. The processed frame could be either a cropped image or a masked image of the current frame.

At step 506, a primary class of the detected object is determined. Once the object is detected, the image frame is first cropped/masked based on the detected object, and then the detected object is classified based on foreground/background detection, into one or more primary classes such as "vehicle", "person", an "unknown", or an "other".

At step 508, a feature representation of the processed current frame is generated by a convolutional encoder. The convolutional encoder includes a series of convolutional layers to produce a feature representation of the cropped image frame. The convolutional layers are a type of neural network that are configured to encode visual information of the cropped image frame into a feature representation. The feature representation is a tensor generated by a neural network that contains learned relevant information about the input.

At step 510, the feature representation is clustered in one or more primary clusters in a clustering space of the primary class, wherein the one or more primary clusters correspond to one or more sub-classes of the primary class. In an example, the clustering space for "car" might cluster the detected cars into separate groups according to make, model, etc.

At step 512, an information vector of the feature representation is generated, that includes information regarding the primary class, the sub-class and one or more external factors associated with the feature representation. The external factors include, the primary class, the sub-class, time, date, weather and other contextual data.

At step 514, each information vector of the video stream is further clustered into one or more secondary clusters by an anomaly clustering module. In anomaly clustering, each variable in the information vector is a clustering dimension.

At step 516, previously formed secondary clusters are being used for generating future predictions regarding data, time, and classes of objects that have been previously captured by the camera. In an example, an object may be predicted at a predefined time and location. In another example, a time of appearance of an object at a predefined location may be predicted. In yet another example, a location of an object at a predefined time may be predicted. The future predictions regarding time, date, location, and class of objects may be used to predict one or more future incidents regarding the previously detected objects.

The present disclosure may be implemented in the form of a computer programmable product for performing real-time recognition of objects. The computer programmable product includes a set of instructions, the set of instructions when executed by a processor causes the processor to perform the methods as discussed with FIG. 5.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor and a memory may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A predictive security camera system comprising:
a camera configured to capture a video stream;
an object detection system configured to:
detect an object in a current frame of the video stream;
process the current frame to generate a processed image frame that contains the detected object; and
determine a primary class of the detected object;
a convolutional encoder configured to:
generate a feature representation of the processed current frame;
a primary clustering module configured to:
cluster the feature representation in one or more primary clusters in a clustering space of the primary class, wherein the one or more primary clusters correspond to a sub-class of the primary class;
a vector generation module configured to:
generate an information vector of the feature representation, wherein the information vector includes a set of variables that include the primary class, corresponding sub-class, and one or more external factors associated with the feature representation;
an anomaly clustering module configured to:
cluster each information vector of the video stream into one or more secondary clusters wherein each variable in the information vector is a clustering dimension; and
report a next frame as an anomaly when a corresponding information vector is positioned outside a secondary cluster of the one or more secondary clusters of an information vector of a previous frame; and
a predictive analysis module configured to:
receive at least one variable of an information vector as an input; and
predict at least one another variable of the information vector based on one or more previous secondary clusters formed by the anomaly clustering module.

2. The predictive security camera system of claim 1, wherein the information vector of a feature representation is a set containing a corresponding class number, a corresponding sub-class, a date, minute of day, a day, a month, a year, and a weather associated with corresponding image frame.

3. The predictive security camera system of claim 1, wherein the camera is selected from at least one of: a traffic camera, a home doorbell camera, a body camera for soldiers or law enforcement, and a camera on an unmanned aerial vehicle (UAV).

4. The predictive security camera system of claim 1, wherein the convolutional encoder includes a series of convolutional layers to produce the feature representation of the processed current frame, wherein the feature representation is a tensor generated by a neural network that contains learned relevant information about the current frame.

5. The predictive security camera system of claim 1, wherein the anomaly clustering module is further configured to detect a negative anomaly in the video stream when a regular event suddenly ceases.

6. The predictive security camera system of claim 1, wherein the predictive analysis module is configured to predict a class of object when the input includes a predefined time and a location.

7. The predictive security camera system of claim 1, wherein the predictive analysis module is configured to predict a time of appearance of an object when the input includes a class of object and a predefined location.

8. The predictive security camera system of claim 1, wherein the predictive analysis module is configured to predict a location of an object when the input includes a class of object and a predefined time.

9. A method for predicting one or more future incidents related to one or more previously detected objects, the method comprising:
capturing a video stream using a camera;
detecting an object in a current frame of the video stream and processing the current frame to generate a processed current frame that contains the detected object;
determining a primary class of the detected object;
generating a feature representation of the processed current frame by a convolutional encoder;
clustering the feature representation in one or more primary clusters in a clustering space of the primary class, wherein the one or more primary clusters correspond to a sub-class of the primary class;
generating an information vector of the feature representation, wherein the information vector includes a set of variables that include the primary class, corresponding sub-class, and one or more external factors associated with the feature representation;

clustering each information vector of the video stream into one or more secondary clusters, wherein each variable in the information vector is a clustering dimension;

reporting a next frame as an anomaly when a corresponding information vector is positioned outside a secondary cluster of the one or more secondary clusters, of an information vector of a previous frame;

receiving at least one variable of the information vector as an input; and predicting at least one another variable of the information vector based on one or more previously formed secondary clusters.

10. The method of claim 9, wherein the information vector of a feature representation is a set containing a corresponding class number, a corresponding sub-class, a date, minute of day, a day, a month, a year, and a weather associated with corresponding image frame.

11. The method of claim 9, wherein the camera is selected from at least one of: a traffic camera, a home doorbell camera, a body camera for soldiers or law enforcement, and a camera on an unmanned aerial vehicle (UAV).

12. The method of claim 9, wherein the convolutional encoder includes a series of convolutional layers to produce a feature representation of the processed current frame, wherein the feature representation is a tensor generated by a neural network that contains learned relevant information about the current frame.

13. The method of claim 9 further comprising detecting a negative anomaly in the video stream when a regular event ceases.

14. The method of claim 9, wherein the predicting at least one another variable includes predicting a class of object when the input includes a predefined time and a location.

15. The method of claim 9, wherein the predicting at least one another variable includes predicting a time of appearance of an object when the input includes a class of object and a predefined location.

16. The method of claim 9, wherein the predicting at least one another variable includes predicting a location of an object when the input includes a class of object and a predefined time.

17. A computer programmable product for predicting one or more future incidents related to one or more previously detected objects, the computer programmable product comprising a set of instructions, the set of instructions when executed by a processor causes the processor to:

capture a video stream using a camera;

detect an object in a current frame of the video stream and process a current frame to generate a processed current frame that contains the detected object;

determine a primary class of the detected object;

generate a feature representation of the processed current frame by a convolutional encoder;

cluster the feature representation in one or more primary clusters in a clustering space of the primary class, wherein the one or more primary clusters correspond to a sub-class of the primary class;

generate an information vector of the feature representation, wherein the information vector includes a set of variables that include the primary class, corresponding sub-class, and one or more external factors associated with the feature representation;

cluster each information vector of the video stream into one or more secondary clusters, wherein each variable in the information vector is a clustering dimension;

report a next frame as an anomaly when a corresponding information vector is positioned outside a secondary cluster of the one or more secondary clusters, of an information vector of a previous frame;

receive at least one variable of the information vector as an input; and predict at least one another variable of the information vector based on one or more previous secondary clusters.

18. The computer programmable product of claim 17, wherein the predicting at least one another variable includes predicting a class of object when the input includes a predefined time and a location.

19. The computer programmable product of claim 17, wherein the predicting at least one another variable includes predicting a time of appearance of an object when the input includes a class of object and a predefined location.

20. The computer programmable product of claim 17, wherein the predicting at least one another variable includes predicting a location of an object when the input includes a class of object and a predefined time.

* * * * *